United States Patent [19]
Gardner

[11] 3,933,253
[45] Jan. 20, 1976

[54] MECHANICAL TURNING DEVICE FOR STRUCTURAL SHAPES

[76] Inventor: Keith Gardner, 49 N. 300 East, Spanish Fork, Utah 84660

[22] Filed: July 30, 1974

[21] Appl. No.: 493,016

[52] U.S. Cl. ............................................. 214/1 Q
[51] Int. Cl.² .......................................... B65G 7/00
[58] Field of Search ....... 214/1 Q, 1 QA, 1 QF, 1 P, 214/1 R, 1 D, 1 CM, 1 BC, 1 BD, 1 B, 1 BH, 1 BV, 27, 28

[56] References Cited
UNITED STATES PATENTS

| | | | |
|---|---|---|---|
| 1,204,821 | 11/1916 | Rosner | 214/1 QG |
| 3,773,189 | 11/1973 | Kitamura et al. | 214/1 QG X |

FOREIGN PATENTS OR APPLICATIONS

| | | | |
|---|---|---|---|
| 141,467 | 11/1961 | U.S.S.R. | 214/1 QG |

*Primary Examiner*—Frank E. Werner
*Attorney, Agent, or Firm*—Rea C. Helm

[57] ABSTRACT

A mechanical turning device for structural shapes has a hollow power driven shaft supported on the end of a frame. Turning jaws are located on the end of an extension shaft which fits inside the hollow shaft and rotates with it and is moved in and out by an air cylinder. The device is wheeled into position at the end of a beam, the air cylinder actuated to move the jaws out to engage the beam end, the shaft rotated to the desired position and the jaws are then retracted.

4 Claims, 3 Drawing Figures

MECHANICAL TURNING DEVICE FOR STRUCTURAL SHAPES

This invention relates to apparatus for rotating a shape about its longitudinal axis and more particularly to a portable device for mechanically turning a beam on the hot bed of a structural rolling mill.

It is frequently necessary to turn a structural steel shape about its longitudinal axis while on the hot bed of a structural rolling mill. This operation is usually performed manually with a long bar having two projections on one end, commonly called an F-wrench. A part of the section of the structural shape is inserted between the two projections of the F-wrench and the structural shape is then manually rotated with the leverage of the F-wrench. Structural shapes may be heavy, for example, a 60 foot, 10 inch I beam, and it is possible while turning a shape for the shape to flip the wrench and jerk it from the grasp of the operator. If the operator loses his grip and does not stand clear of the wrench travel, he may be struck by the wrench. The wrench could also fly from his grasp and endanger others.

It is therefore an object of my invention to provide an apparatus for mechanically turning a structural shape.

Another object of my invention is to provide apparatus for turning a structural shape that is safe to operate.

These and other objects will be more apparent after referring to the following specification and drawings in which:

FIG. 3 is an end view of the turning jaws.

Figure 1:
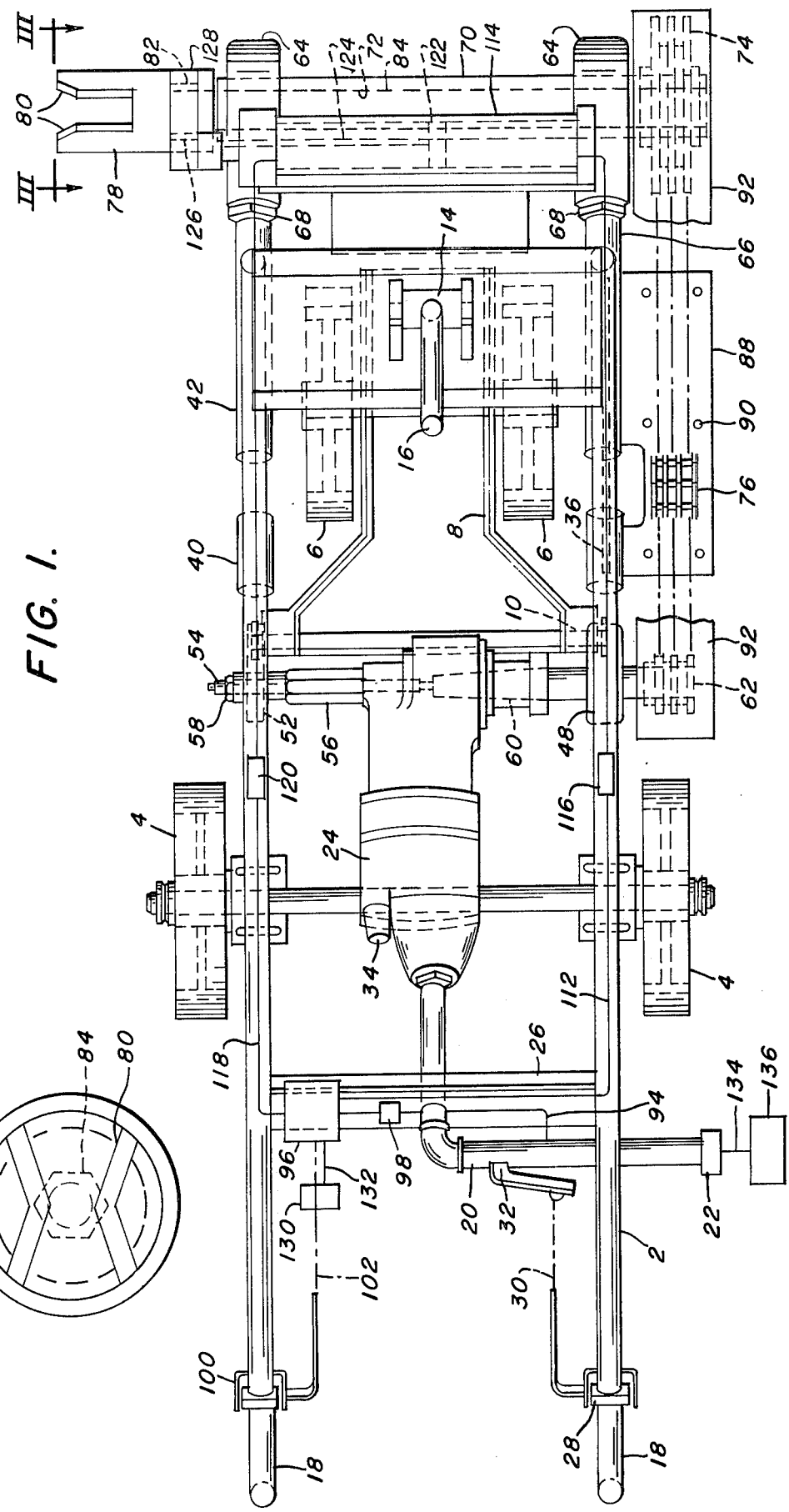
FIG. 1 is a partial plan view of the preferred embodiment of my invention.

Referring now to the drawings in which like reference numerals refer to like parts throughout, reference numeral 2 indicates a tubular frame member supported on two rear wheels 4 and two vertically adjustable front wheels 6. Wheels 6 are mounted on a wheel bracket 8 connected to frame 2 at a pivot 10. A first trunnion 12 mounted on wheel bracket 8 and a second trunnion 14 mounted on frame 2 have screw threads in opposite directions and adapted to raise and lower the front end of frame 2 with rotation of a threaded crank 16 fitting in trunnions 12 and 14. Frame 2 has a pair of upwardly and rearwardly extending right and left handles 18.

An air supply conduit 20 is mounted on the rear of frame 2 and has a hose connection fixture 22 on the inlet end. The other end of conduit 20 connects to a compressed air motor or wrench 24 such as an Ingersoll-Rand Multi Vane Air Drill No. R44SE. Conduit 20 supports one end of motor 24 by connection to a frame cross bracket 26. A first control handle 28 on right handle 18 connects through a linkage 30 to a spring loaded control valve 32 in conduit 20. Motor 24 has a directional control knob 34.

A corner plate 36 is attached inside each side of frame 2 at the forward V of the frame. Plates 36 each have a cut out 38. Mounted along the outside of each corner plate in axial alignment is a short length of threaded pipe 40 and a long length of threaded pipe 42. A screw 44 is threaded to fit inside pipes 40 and 42 projecting rearward from pipe 42. Nuts 46, accessible through cutout 38, hold screw 44 in place. A screw conveyor hanger bearing 48 is held in place on the end of the screw 44 on the right side by a jam nut 50. An eye 52 is held in place on the end of the screw 44 on the left side by another jam nut 50. A knock out shaft 54, surrounded by a hollow pin 56, holds the left side of motor 24 to frame 2 by a nut 58. A tapered shaft 60 connects the right side of motor 24 to bearing 58 and has a drive sprocket 62 keyed to its outside end. A screw conveyor hanger bearing 64 is attached to the forward end of each pipe 42 by a screw 66 and held in place by a jam nut 68. A drive shaft 70 is supported in bearings 64, has a hollow hexagonal shaped center 72 and a sprocket 74 on the right outer end. A drive chain 76 extends around sprockets 62 and 74. A fork assembly 78 has a set of turning jaws 80 on one end projecting outwardly from the left side of frame 2, an annular groove 82 adjacent jaws 80 and a hexagonal shaped extension shaft 84 adapted to move longitudinally inside the hexagonal center 72 of shaft 70 and to be rotated by shaft 70. A bracket 86 attached to plate 36 on the right side holds a chain guard mounting plate 88. A plurality of pipe spacers 90 secures a chain guard 92 to mounting plate 88.

An air supply by pass line 94 is connected to conduit 20 between valve 32 and coupling 22 to a positioning control valve 96 through a regulator 98. A second control handle 100 on left handle 18 connects through a linkage 102 to valve 96. A spring 104 holds handle 100 in the "retract" position 106 when no external force is applied to handle 100. Handle 100 may move valve 96 to a "neutral" position 108 or to an "extend" position 110. An "extend" supply line 112 connects valve 96 to the right end of an air cylinder 114 through a flow control valve 116. A "retract" supply line 118 connects valve 96 to the left end of air cylinder 114 through a flow control valve 120. A piston 122 inside cylinder 114 has a rod 124 connected to a fork 126 and cap 128 surrounding shaft 70 is groove 82. An exhaust muffler 130 is connected to valve 96 by an exhaust line 132.

To operate my device for turning structural shapes, the device is wheeled to position adjacent the end of the beams which are normally roughly aligned on the hot bed. Crank 16 is rotated until jaws 80 are the desired height to engage the beam ends. A hose 134, connected to a suitable source of compressed air 136, is connected to coupling 22. The source should be that required for air motor 24 and then regulator 98 is adjusted to compensate for the smaller air requirements of cylinder 114. Regulator 98 also acts to smooth out any irregularities in the air supply. The jaws 80 are aligned with the beam to be turned and the second control handle 100 fully depressed to position 110. This exhausts air from the left side of the cylinder through line 132 at the neutral position and then applies air pressure to the right side of cylinder 114 extending jaws 80 outwardly to engage, for example, the web of an I beam. The lever may then be released to the neutral position 108 which exhausts air from the right side of the cylinder through line 132 and jaws 80 therefore remain in the extended position. Control valves 116 and 120 provide a dampering or cushioning effect to the air flow to cylinder 114 and prevent slamming of jaws 80. The first control handle 28 is then depressed to open valve 32 against a spring bias supplying air to motor 24. Motor 24 rotates shaft 60, sprocket 62, driving chain 76 and sprocket 74, rotating shaft 72, extension shaft 84 and jaws 80 to rotate the beam as desired. Handle 28 is then released and the spring bias turns valve 32 off to stop rotation. Handle 100 is then released to move it to the retract position 110 whereupon air travels in line 118 to cylinder 114 to move piston 122 to the right disengaging jaws 80 from the beam. The operation may then be repeated by repositioning the device for the next beam to be turned.

Figure 2:
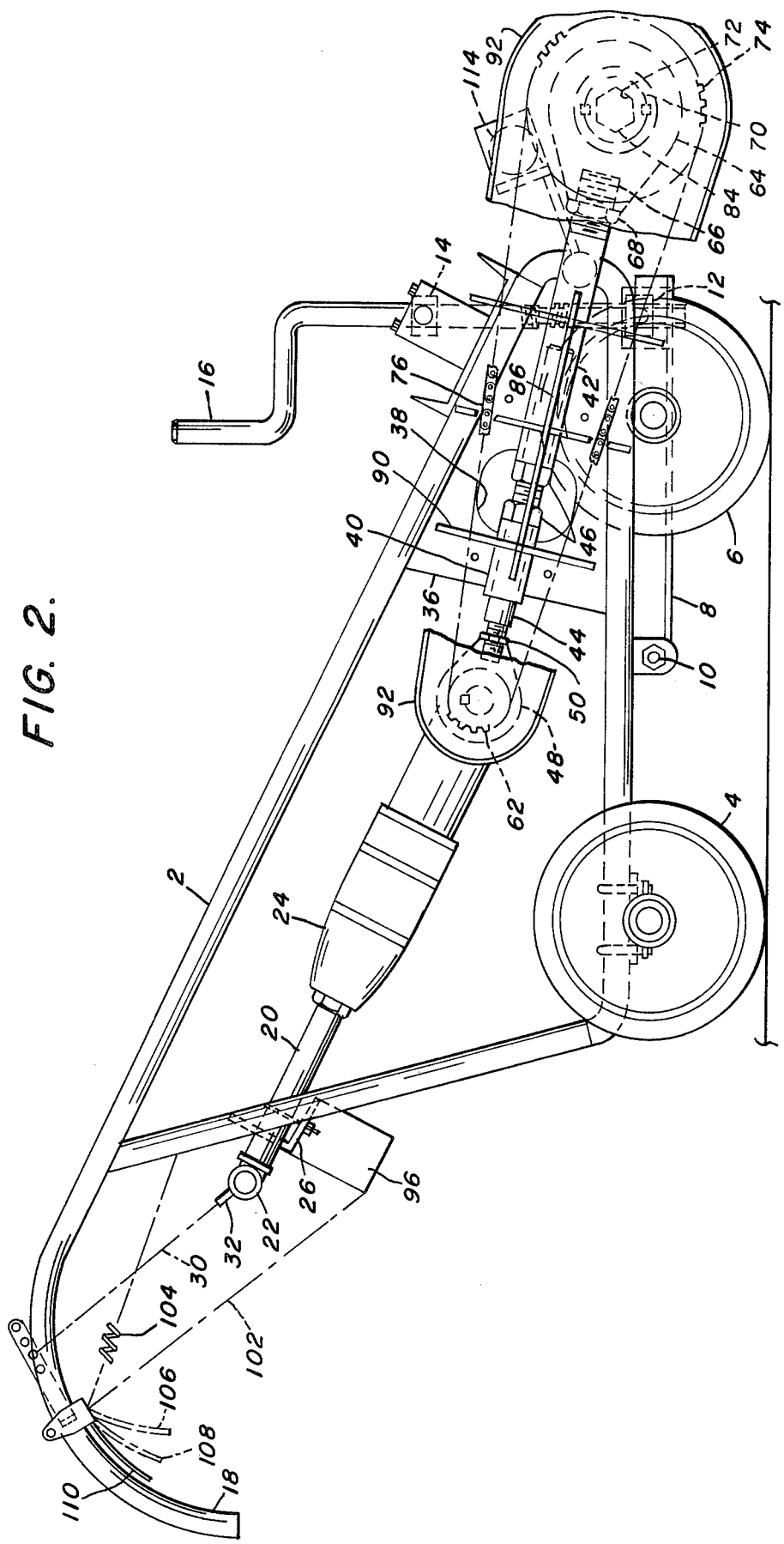
FIG. 2 is a partial elevational view of the preferred embodiment of my invention.

It is preferred that shaft 70 rotate in a counter clockwise direction (FIG. 2) so that the torque of turning operates against the device. However, the direction may be reversed by resetting direction control 34. Adjustable height wheels 6 may be omitted where it is possible for the operator to balance the device on wheels 8 but the direction of rotation should then be only counter clockwise.

While my apparatus has been described as operated by compressed air, obviously the device may be operated by other fluids or may be powered electrically. It is also apparent that other adaptations and modifications may be made to my invention.

I claim:

1. A mechanical turning device for structural shapes comprising
   a frame member,
   a pair of spaced apart bearings mounted on one end of the frame and with one bearing on one side of the frame and the other bearing on the other side of the frame,
   a hollow drive shaft supported to rotate in the bearings,
   an extension shaft fitting inside the hollow drive shaft and adapted for rotation with the drive shaft and for longitudinal movement with respect to the drive shaft,
   turning jaws mounted on the end of the extension shaft for engaging the end of a structural shape,
   means connected to the drive shaft for rotating the drive shaft selectively in either direction of rotation to a desired angle of rotation,
   means connected to the extension shaft for selectively moving the extension shaft longitudinally with respect to the drive shaft, and
   a pair of wheels and a supporting axle mounted on the frame for movement of the device to a position for engaging the end of a structural shape.

2. A device according to claim 1 in which the means for rotating the drive shaft includes a drive motor mounted on the frame, a control handle connected to the motor and mounted on the other end of the frame for controlling the motor, and power transmission means connecting the motor to the drive shaft.

3. A device according to claim 2 in which the means for moving the extension shaft includes an air cylinder mounted on the frame and having a double acting piston, control means connected to the cylinder and means connecting the piston to the extension shaft for longitudinal movement of the extension shaft upon movement of the piston.

4. A device according to claim 3 which includes a vertically adjustable pair of wheels and supporting axle mounted on the frame.

* * * * *